US009492770B2

(12) United States Patent
Foohey et al.

(10) Patent No.: US 9,492,770 B2
(45) Date of Patent: Nov. 15, 2016

(54) FILTERS

(71) Applicant: Pall Corporation, Port Washington, NY (US)

(72) Inventors: Mark William Foohey, Austin, TX (US); Anthony William Gatica, Cedar Park, TX (US); Vincent Lam, Austin, TX (US); Jacob Peter Vanderheyden, Saint Paul, MN (US); Tatsuya Hoshino, Ibaraki (JP)

(73) Assignee: Pall Corporation, Port Washington, NY (US)

( * ) Notice: Subject to any disclaimer, the term of this patent is extended or adjusted under 35 U.S.C. 154(b) by 291 days.

(21) Appl. No.: 14/068,692

(22) Filed: Oct. 31, 2013

(65) Prior Publication Data

US 2015/0114894 A1   Apr. 30, 2015

(51) Int. Cl.
*B01D 27/08* (2006.01)
*B01D 35/30* (2006.01)
*B01D 35/31* (2006.01)

(52) U.S. Cl.
CPC ............. *B01D 35/30* (2013.01); *B01D 27/08* (2013.01); *B01D 35/31* (2013.01); *B01D 2201/24* (2013.01); *B01D 2201/301* (2013.01); *B01D 2201/303* (2013.01)

(58) Field of Classification Search
CPC ............. B01D 35/30; B01D 35/31; B01D 2201/24; B01D 35/303; B01D 46/42; B01D 65/00; B01D 2201/302; B01D 2201/4023; B01D 2201/4015; B01D 27/08; B01D 2311/2649; B01D 46/4227; C02F 2201/002; C02F 2201/003; C02F 2201/006; C02F 2203/006; C02F 9/00; C02F 2307/00; C02F 2307/02; C02F 2307/04
See application file for complete search history.

(56) References Cited

U.S. PATENT DOCUMENTS

| 3,849,309 | A | * | 11/1974 | Morris | B01D 29/21 162/166 |
|---|---|---|---|---|---|
| 5,338,446 | A | | 8/1994 | Schuman et al. | |
| 5,925,245 | A | | 7/1999 | Bradford et al. | |
| 6,283,013 | B1 | * | 9/2001 | Romandy | A47J 31/0636 99/319 |
| D513,304 | S | | 12/2005 | Suzuki | |
| 7,021,667 | B2 | | 4/2006 | Campbell et al. | |
| 7,338,599 | B2 | | 3/2008 | Hiranga et al. | |

(Continued)

FOREIGN PATENT DOCUMENTS

| JP | 6077008 A | 5/1985 |
|---|---|---|
| JP | 2004-19901 A2 | 1/2004 |

(Continued)

*Primary Examiner* — Lucas Stelling
(74) *Attorney, Agent, or Firm* — Jeremy Jay

(57) ABSTRACT

A filter has first and second fittings, a permeable filter medium, and a housing. The housing defines a fluid flow path within the housing between the first and second fittings, and the permeable filter medium is arranged in the fluid flow path to remove one or more substances from a fluid flowing along the fluid flow path. A finger hold is positioned in an upper region of the housing, the finger hold defining a space that is sufficient to allow one or more fingers of an operator to fit in the space and grasp the filter.

7 Claims, 6 Drawing Sheets

(56) References Cited

U.S. PATENT DOCUMENTS

| | | | |
|---|---|---|---|
| 7,469,932 B2 | 12/2008 | Niermeyer et al. | |
| 8,069,991 B2 | 12/2011 | Norris et al. | |
| 2003/0213736 A1 | 11/2003 | Hiranaga et al. | |
| 2004/0182777 A1 | 9/2004 | Stankowski et al. | |
| 2006/0124532 A1* | 6/2006 | Magnusson | B01D 35/153 210/420 |
| 2007/0131606 A1 | 6/2007 | Klein et al. | |
| 2009/0236341 A1 | 9/2009 | McKinney et al. | |
| 2010/0163477 A1* | 7/2010 | Noh | B01D 35/153 210/236 |
| 2011/0211976 A1 | 9/2011 | Magoon et al. | |
| 2011/0247974 A1 | 10/2011 | Gale et al. | |
| 2013/0031926 A1 | 2/2013 | Huda et al. | |
| 2015/0113925 A1 | 4/2015 | Gatica et al. | |
| 2015/0114896 A1 | 4/2015 | Lam et al. | |

FOREIGN PATENT DOCUMENTS

| | | |
|---|---|---|
| JP | 2004-503357 A | 2/2004 |
| JP | 2005-254103 A2 | 9/2005 |
| JP | 2007-522928 A | 8/2007 |
| JP | 2009-018308 A2 | 1/2009 |
| JP | 2011-224481 A2 | 11/2011 |
| WO | WO 2007/012079 A2 | 1/2007 |

\* cited by examiner

FILTERS

DISCLOSURE OF THE INVENTION

The present invention relates to filters which remove one or more substances from a fluid, for example, a liquid, flowing through the filter. Each filter may include at least first and second fittings, for example, an inlet fitting and an outlet fitting, and a housing that defines a fluid flow path between the first and second fittings. The filter may further include a permeable filter medium positioned in the fluid flow path in the housing. Undesirable substances, including particulates, such as solid or colloidal particles, gels, and gas bubbles, become trapped within or on the permeable filter medium as the fluid flows along the fluid flow path through the permeable filter medium, removing the undesirable substances from the fluid.

The fluid may be introduced to and extracted from the filter by a manifold, which may also include first and second fittings. The manifold may supply an unfiltered feed or process fluid to the filter via a feed fitting and may extract filtered fluid, or filtrate, from the filter via a filtrate fitting. The filter may thus be mounted to the manifold with the feed fitting of the manifold sealingly engaged with the inlet fitting of the filter and the filtrate fitting of the manifold sealingly engaged with the outlet fitting of the filter. After the fluid has flowed through the filter for some time, the permeable filter medium may become fouled or clogged with the undesirable substances removed from the fluid. Fluid flow through the filter may then be terminated, and the filter, which may remain full of the fluid, may be removed from the manifold. The filter may then be emptied and the permeable filter medium may be cleaned or replaced, or an entirely new filter may be provided. The cleaned or new filter may then be mounted to the manifold and flow through the filter may resume.

In accordance with one aspect of the invention, filters embodying the invention may comprise first and second fittings, a permeable filter medium, a housing, and a finger hold. The housing may have a longitudinal axis, an upper region, a bottom and an exterior. As previously described, the housing defines a fluid flow path within the housing between the first and second fittings, and the permeable filter medium is arranged in the fluid flow path to remove one or more undesirable substances from fluid flowing along the fluid flow path. The finger hold, which may be positioned in the upper region of the housing, may include a first portion and a second portion. The first portion of the finger hold extends outwardly from the exterior of the housing. The second portion of the finger hold extends from the first portion downwardly toward the bottom of the housing. The length and width of the second portion and the distance between the second portion and the housing define a space that is sufficient to allow one or more fingers of an operator to fit in the space around the second portion and grasp the filter.

Filters embodying the invention have many advantages. For example, many fluids may be toxic or corrosive, so handling the filter, which may be filled with the fluid, can be hazardous. The finger hold allows the operator to maintain a firm, steady grip on the filter and prevent spills when the filter is handled, e.g., when the filter is removed from the manifold.

DESCRIPTION OF EMBODIMENTS OF THE INVENTION

Figure 1:
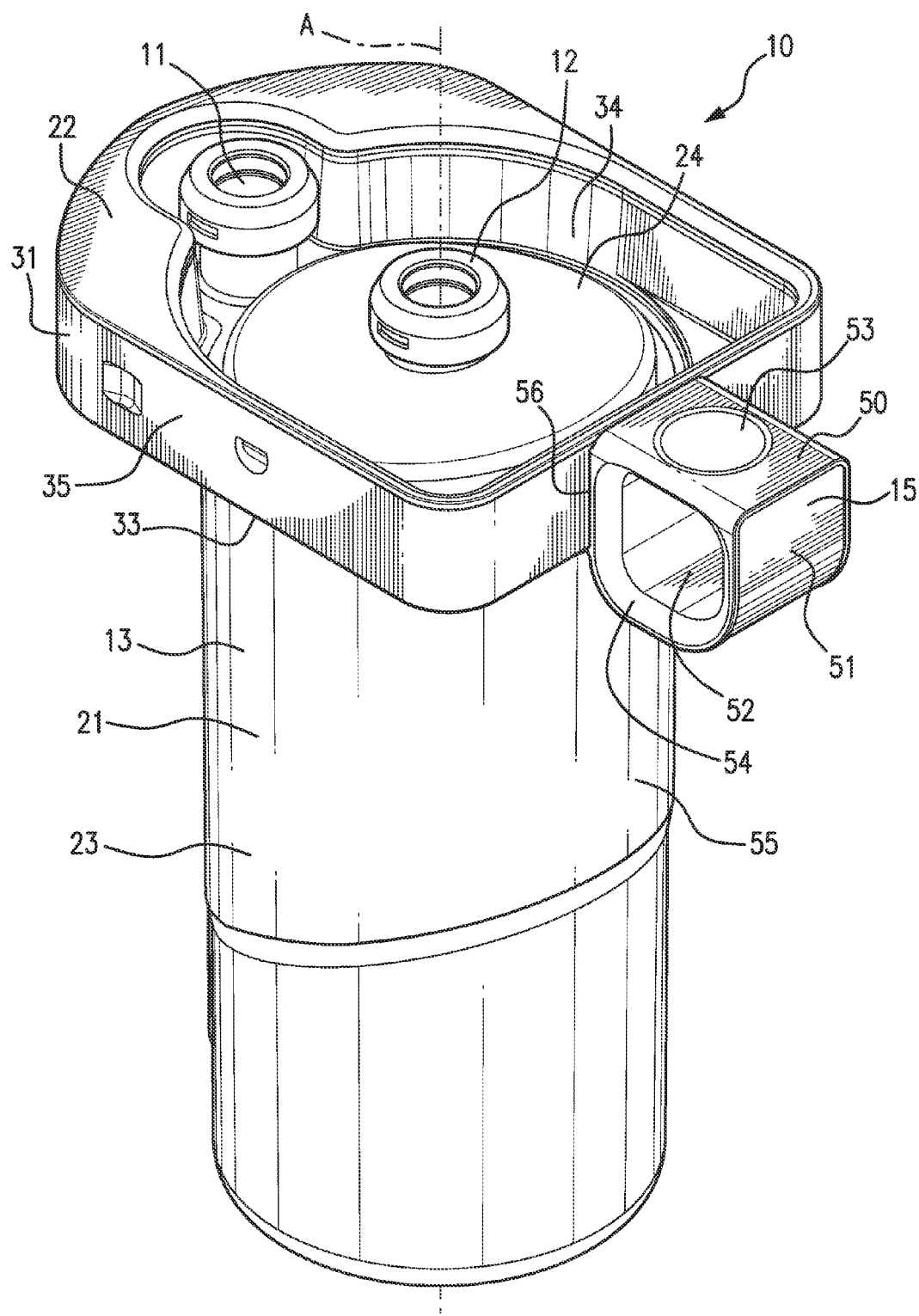
FIG. 1 is a top perspective view of one embodiment of a filter.
Figure 2:
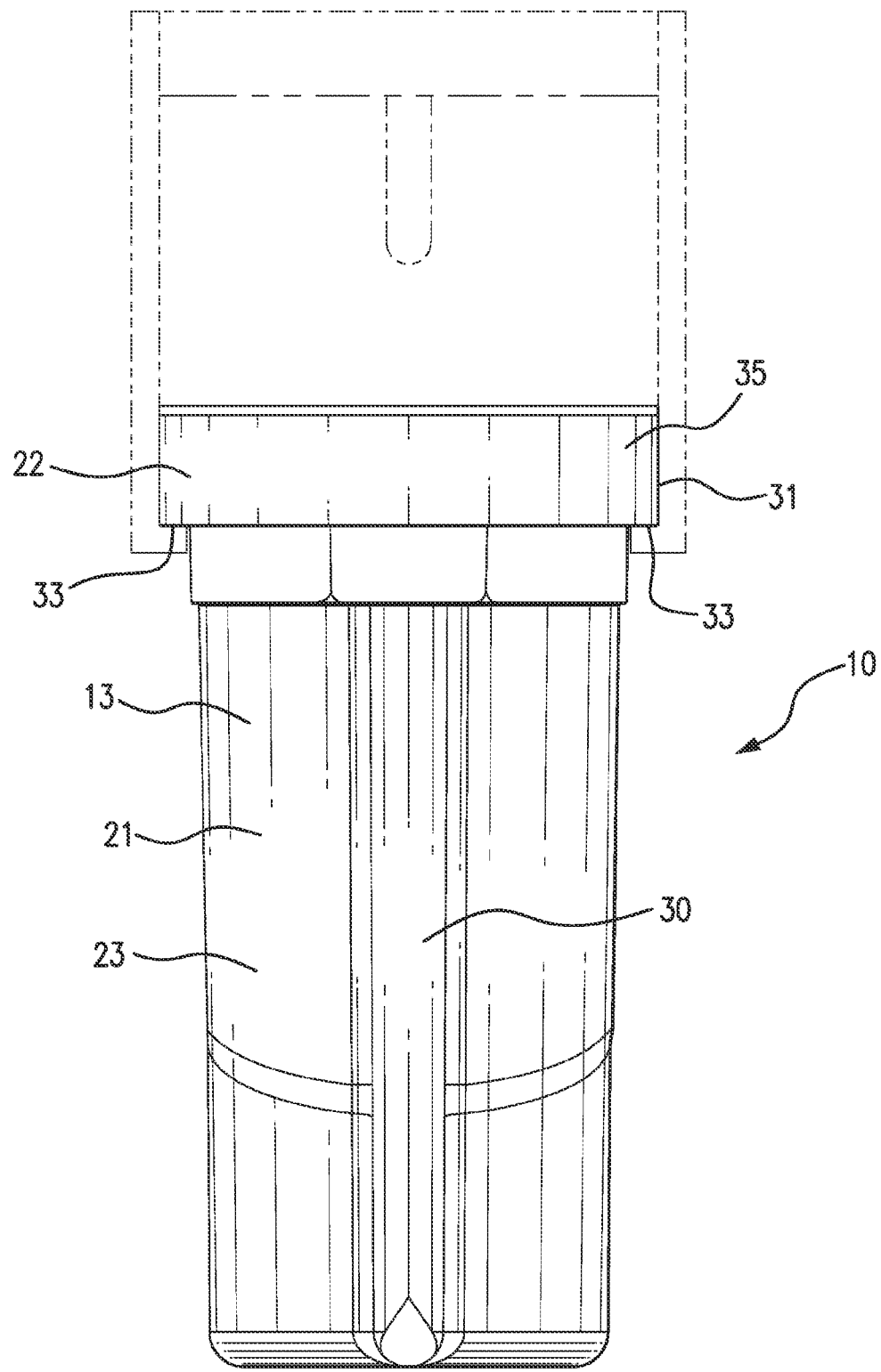
FIG. 2 is a front view of the filter of FIG. 1 showing a manifold in phantom.
Figure 3:
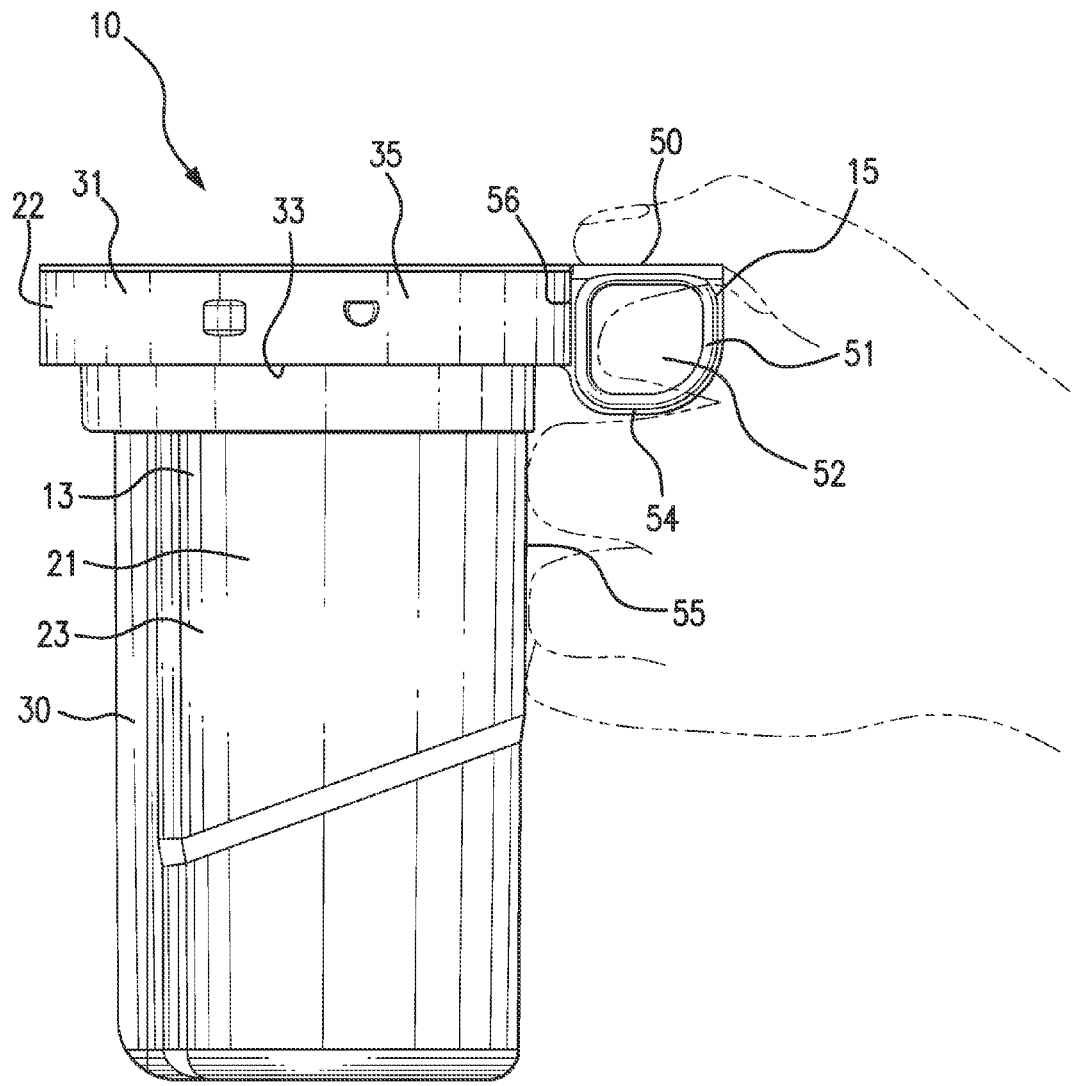
FIG. 3 is a side view of the filter of FIG. 1.
Figure 4:
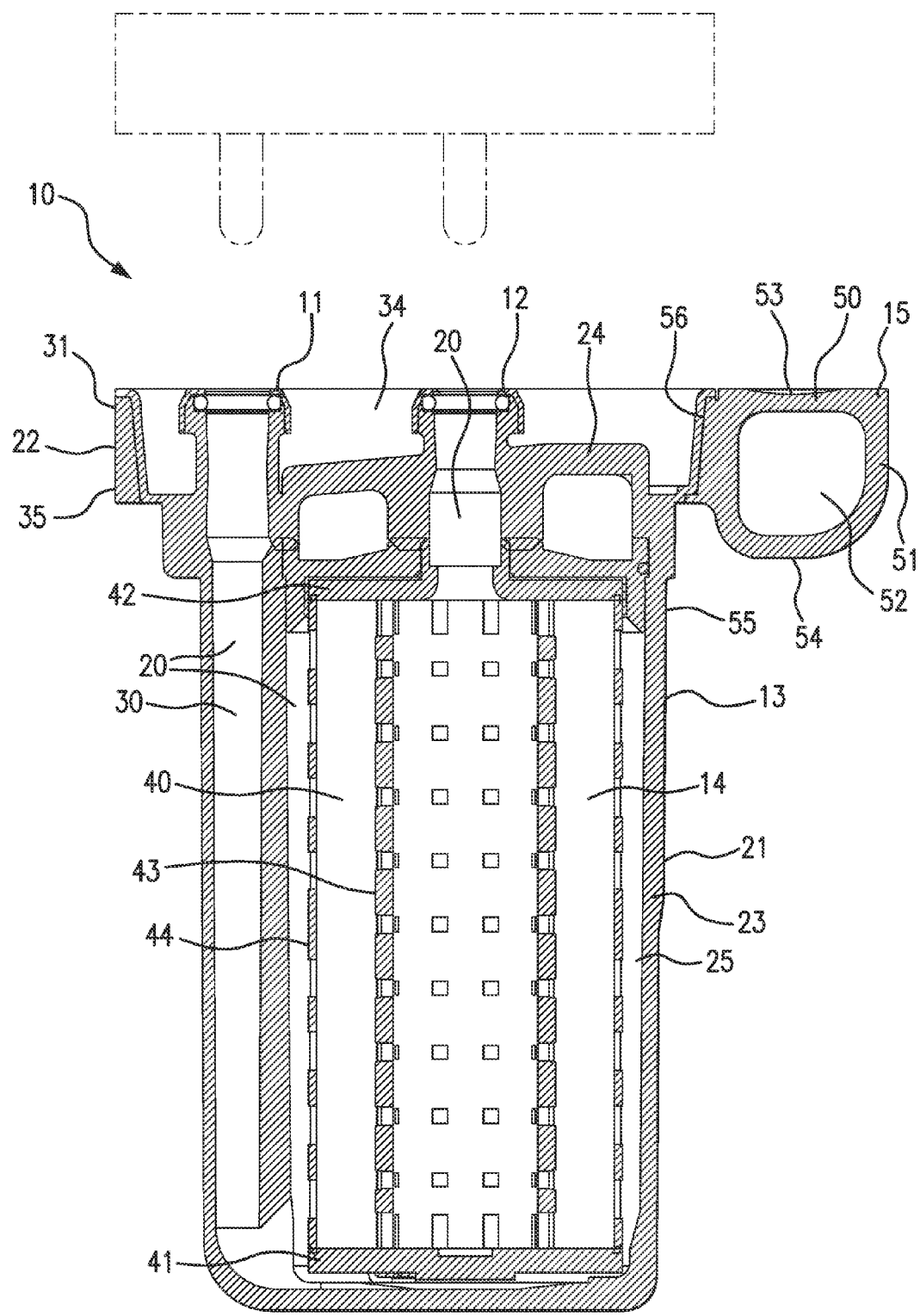
FIG. 4 is a cross sectional view of the filter of FIG. 3 showing a manifold in phantom.
Figures 5A, 5B:
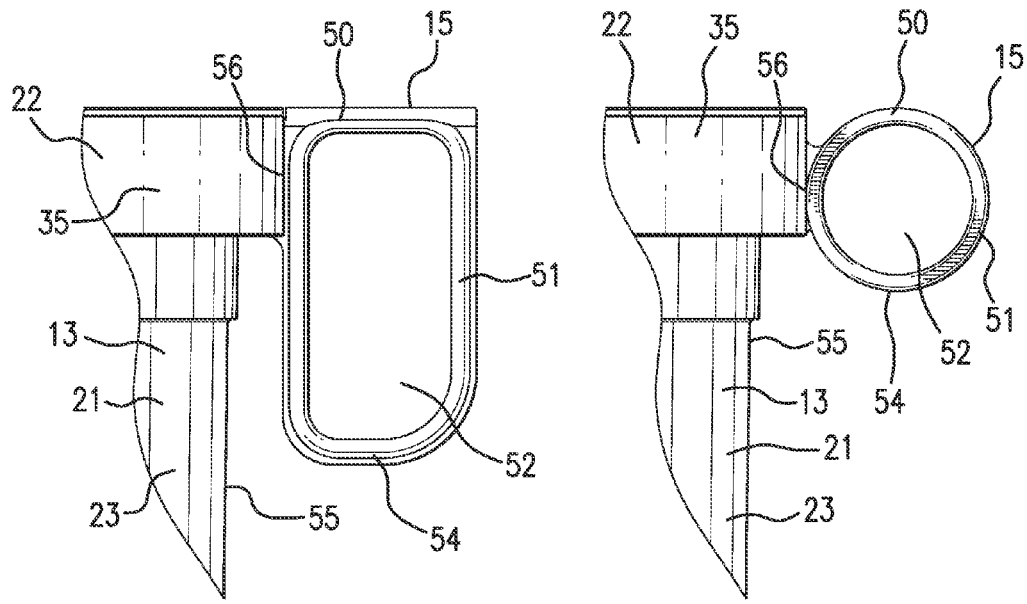
FIGS. 5A-5D are side views of additional embodiments of the finger hold.
Figures 5C, 5D:
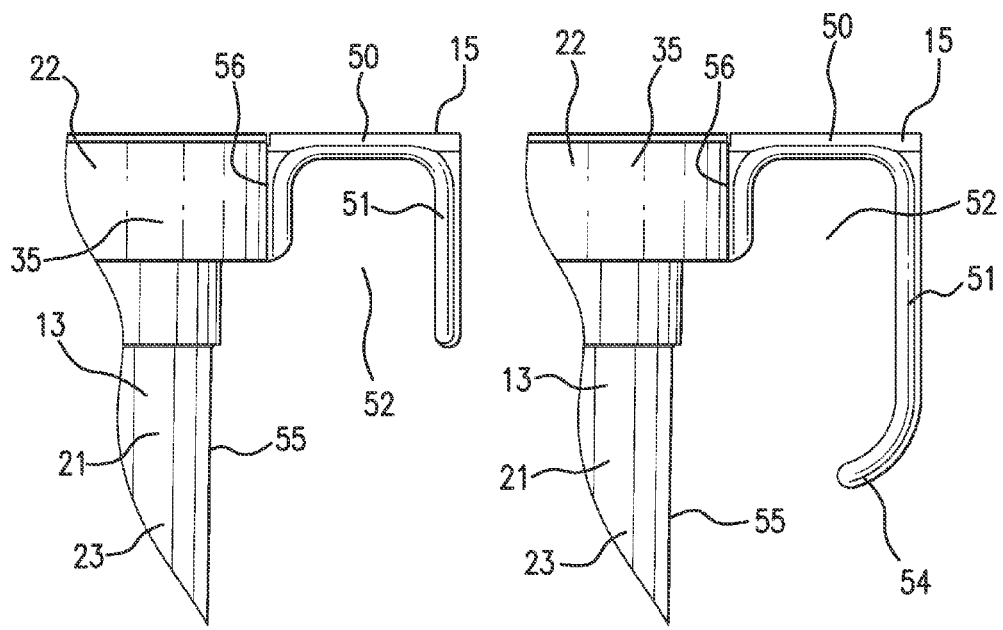

Filters embodying the invention may be configured in a variety of ways. One of many different examples of a filter 10 embodying the invention is shown in FIGS. 1-4. Generally, the filter 10 may comprise at least first and second fittings 11, 12, a housing 13, a permeable filter medium 14, and a finger hold 15. The housing 13 defines a fluid flow path 20 within the housing 13 between the first and second fittings 11, 12. The permeable filter medium 14 may be arranged within the housing 13 in the fluid flow path 20 to remove one or more substances from a fluid flowing along the fluid flow path 20. The finger hold 15 allows an operator to securely handle the filter 10 without spilling fluid from the filter 10.

The first and second fittings may be variously configured. For example, the first and second fittings of the filter may be configured to sealingly engage, and disengage from, first and second fittings of a manifold which supplies feed or process fluid to, and extracts filtrate from, the filter. For some embodiments, the first and second fittings of the filter and the first and second fittings of the manifold may be configured as mating nozzles and receptacles. The nozzles are received within the receptacles and are variously sealed within the receptacles, for example, by O-rings, gaskets, and/or face seals. Some examples of nozzles and receptacles are described in U.S. Pat. No. 7,807,055. In the illustrated embodiment, the first and second fittings 11, 12 of the filter 10 may each comprise a receptacle, while the first and second fittings of the manifold may comprise nozzles. (See, for example, the dashed portion of FIGS. 2 and 4.) Alternatively, one or both of the filter fittings may comprise a nozzle and one or both of the manifold fittings may comprise a receptacle, or the filter and manifold fittings may comprise any other type of fitting.

The first and second fittings of the filter may serve a variety of functions. For some, but not all, embodiments, the first and second fittings 11, 12 may respectively comprise an inlet fitting, e.g., a feed inlet fitting, and an outlet fitting, e.g., a filtrate outlet fitting, of the filter 10. Further, the first and second fittings may be positioned at a variety of locations on the housing. For example, one or both of the fittings may be positioned at one or the other end of the housing, i.e., the top end and/or the bottom end, or on the side of the housing. In the illustrated embodiment, the first and second fittings 11, 12 of the filter 10 may both be positioned in an upper region of the housing 13, for example, on top of the housing 13. Additionally, the filter may include more than the first and second fittings. For example, in addition to the inlet and outlet fittings, a vent fitting may be positioned at the top of the housing to vent gas from the housing as it fills with liquid.

The housing may be configured in any of numerous ways. For example, the housing may have any of a variety of irregular shapes or regular shapes, including a generally cylindrical shape. The housing may be openable, allowing a fouled permeable filter medium to be removed from the interior of the housing and cleaned or replaced. For example, the housing may include a bowl and a header, cover, and/or base removably attached to the bowl in any of a variety of ways. Alternatively, the housing may be permanently closed with the permeable filter medium permanently sealed inside the housing. Once the filter medium becomes fouled, both the housing and the permeable filter medium may be replaced together as a single unit. In addition, the housing may be fashioned from a variety of impermeable materials, including metals, such as stainless steel, and polymers, such as polypropylene or high density polyethylene (HDPE).

One of many different examples of a housing 13 is shown in FIGS. 1-4. The housing 13 may include a longitudinal axis A and may comprise a body 21 and a flange 22. The body 21 may be configured in any of numerous ways. For some embodiments, the body 21 may comprise a bowl 23 which may contain the permeable filter medium 14 and a cover 24 removably or permanently attached to the top of the bowl 23. The interior of the housing 13, e.g., the interior of the bowl 23, may define a filter chamber 25. The filter chamber 25 may comprise a portion of the fluid flow path 20, and the permeable filter medium 14 may be positioned in the filter chamber 25, for example, across the fluid flow path 20. The first and second fittings may fluidly communicate with the filter chamber in a variety of ways to direct fluid along the fluid flow path through the filter chamber. For example, both fittings may be positioned in or on the top of the body, e.g., in or on the cover, and may open through the body, e.g., through the cover, into the top of the filter chamber. For some embodiments, the inlet fitting 11 may open into a fluid conduit 30 in the body 21 that directs the fluid from the top of the housing 13, e.g., from the cover 24, toward the bottom of the housing 13 outside the filter chamber 25. The conduit 30 may open into the filter chamber 25 at or near the bottom of the filter chamber 25, while the outlet fitting 12 may open through the top of the housing 13, e.g., the cover 24, into the top of the filter chamber 25. This arrangement may facilitate the clearance of gas, e.g., air, or preconditioning or preservative liquid from the filter chamber and the remainder of the fluid flow path as the housing fills with fluid.

The flange 22 may be positioned in an upper region of the housing 13, for example, on top of the body 21, and may have an irregular shape or a regular shape, e.g., a generally circular, oval, or rectangular shape. For some embodiments, the flange 22 may include one or more regions 31 that extend outwardly from the body 21 generally laterally, i.e., in a direction generally perpendicular to the longitudinal axis A of the housing 13. The flange may serve any of numerous functions. For example, the flange may serve as a mechanism for mechanically mounting the filter to a manifold. For some embodiments, the outwardly extending region 31 of the flange 22 may define one or more ledges 33 that face downwardly toward the bottom of the housing 13 and extend in a plane generally perpendicular to the longitudinal axis on opposite sides of the housing 13. The flange 22 of the filter 10 may be mounted to the manifold, for example, by sliding each ledge 33 of the filter 10 along a corresponding mounting shelf of the manifold.

Alternatively or additionally, the flange may provide a drip reservoir that serves to further protect against leaks and spills. For example, the flange 22 may define a drip reservoir 34 and may include a wall 35 that surrounds the drip reservoir 34. The wall of the flange may be arranged with an upper region of the body in a variety of ways to define the drip reservoir. For example, the drip reservoir 34 may be configured as a basin that extends below the top of the wall 35 toward the body 21. For some embodiments, the top of the body 21, e.g., the cover 24, may serve as the bottom of the drip reservoir 34, and the wall 35 of the drip reservoir 34 may be connected to the upper region of the body 21, e.g., around the outer periphery of the cover 24. The first and second fittings, as well as any additional fittings, may be positioned in the drip reservoir in any of a variety of ways. For example, the first and second fittings 11, 12 may be positioned in the drip reservoir 34 in or on top of the housing 13 or body 21, e.g., in or on the cover 24. The wall 35 may surround the fittings 11, 12, as well as the drip reservoir 34, and the top of the wall 35 may be even with or extend above the top of the fittings 11, 12. Any leakage or spillage from the fittings is then safely collected within the drip reservoir, isolating any hazardous fluid from the operator handling the filter.

For some embodiments, the drip reservoir may be associated with the flange. For other embodiments, a drip reservoir may be provided without a flange. For example, a collar may define a wall extending upwardly from the top of the body in an axial direction generally parallel to the longitudinal axis A of the housing, surrounding the fittings on top of the housing. The exterior of the collar may be aligned with, or inset from, the exterior of the body, and the drip reservoir may be defined within the interior of the collar. Again, any leakage or spillage from the fittings may then be safely contained within the drip reservoir. Still other embodiments may not have a drip reservoir. For example, the housing may include a flange without a drip reservoir, or the housing may include neither a flange nor a drip reservoir.

The permeable filter medium may be configured in any of numerous ways. For example, the permeable filter medium may comprise a pleated or spirally-wound permeable sheet having one or more layers, including a filter medium layer, one or more drainage and/or support layers, and/or a cushioning layer. Alternatively, the permeable filter medium may comprise a bundle of permeable hollow fibers or a permeable mass, e.g., a hollow cylindrical permeable mass. The filter medium may be formed from any of numerous materials, including, but not limited to, any of various polymeric materials, and may be fashioned, for example, as a woven or nonwoven sheet, a mesh, or a mass of filaments or fibers or as a permeable membrane, e.g., in the form of a sheet or hollow fibers. The permeable filter medium may have a wide range of filtration characteristics. For example, the permeable filter medium may be porous, permeable, semipermeable, or permselective, and the removal rating may be in the range from microporous or coarser to ultraporous, nanoporous, or finer.

For many embodiments, the permeable filter medium may be a portion of a filter element that may be permanently or removably mounted in the housing, e.g., in the filter chamber. The filter element may be configured in any of a variety of ways. For example, in the illustrated embodiment, the permeable filter medium 14 may be a portion of a filter element 40 additionally comprising a blind end cap 41 and an open end cap 42 capping opposite axial ends of the filter medium 14. The open end cap 42 may include an opening that fluidly communicates between the hollow interior of the filter element and the outlet fitting. A perforated core 43 and a perforated cage 44 may be positioned around the interior and exterior of the permeable filter medium 14 to support the filter medium 14 against radially directed forces.

The filter element 40 and the permeable filter medium 14 may be arranged in the housing 13, e.g., in the body 21, the bowl 23, and/or the filter chamber 25, to filter fluids in a direct or dead-end mode of filtration, i.e., where all fluid flowing along the fluid flow path 20 flows through the permeable filter medium 14. Alternatively, the filter element and the permeable filter medium may be arranged in the housing, e.g., in the body, the bowl, and/or the filter chamber, to filter fluids in a tangential or cross flow mode of filtration, i.e., where fluid flowing along the fluid flow path flows tangentially along the surface of the permeable filter medium. A portion of the fluid flowing tangentially along the filter medium passes as filtrate or permeate through the filter medium, the remainder of the fluid passing as retentate or concentrate from the housing, for example, via an additional fitting, e.g., a retentate outlet fitting, in the housing.

The finger hold may be configured in any of numerous ways. For example, the finger hold may be connected to the housing in various locations, including the body or the flange or the bowl or the cover. For some embodiments, the finger hold 15 may extend outwardly from the housing 13 in an axial plane extending through the longitudinal axis A, e.g., on the side of the housing 13 opposite the inlet conduit 30. In the illustrated embodiment, the finger hold 15 may be connected to the flange 22. For example, the finger hold 15 may be connected to the wall 35 of the flange 22. Alternatively, the finger hold may be connected to the wall in other regions of the flange or to the body, e.g., under the flange.

The finger hold may be configured in a great variety of ways. For example, the finger hold 15 may include a first portion 50 that extends outwardly from the exterior of the housing 13, e.g., from the wall 35 of the flange 22. For example, the first portion 50 may extend generally laterally in a direction generally perpendicular to the longitudinal axis A of the housing 13. The finger hold 15 may also include a second portion 51 that extends downwardly toward the bottom of the housing 13 from the first portion 50, e.g., from the outer end of the first portion 50. For example, the second portion 51 may extend generally longitudinally, i.e., in a direction generally parallel to the longitudinal axis A. The first and second portions 50, 51 may be straight or curved and may be distinct pieces or integrally formed. The length and width of the second portion 51 of the flange 22 and the distance between the second portion 51 and the exterior of the housing 13 define a space 52 that is sufficiently large to allow one or more fingers of an operator to fit in the space and wrap at least partially around the second portion 51. For some embodiments, the length of the second portion 51 may be up to about 4 inches (10 cm) or more, e.g., about 3 inches (8 cm) or less or about 2 inches (5 cm) or less or about 0.75 inch (2 cm) to about 1.25 inches (3 cm); the width of the second portion 51 may be up to about 1 inch (2.5 cm) or more, e.g., about 0.75 inch (2 cm) or less or about 0.5 inch (13 mm) or less or about 0.25 inch (6 mm) or less; and the distance between the second portion 51 and the exterior of the housing 13 may be up to about 2 inches (5 cm) or more, e.g., about 1.5 inches (3.8 cm) or less or about 1 inch (2.5 cm) or less or about 0.75 inch (2 cm) or less. The length and width of the first portion 50 of the finger hold 15 may be similar to, or larger or smaller than, those of the second portion 51. For some embodiments, the top of the first portion 50 may extend in a plane generally perpendicular to the longitudinal axis A and/or the first portion 50 may also include a depression 53 on top sized to fit the thumb of an operator. For example, the depression 53 may have a diameter of up to about 0.75 inch (2 cm) or more, e.g., about 0.65 inch (17 mm) or less or about 0.375 inch (10 mm) inch or less, and a depth of up to about 0.25 inch (6 mm) or more, e.g., about 0.125 inch (3 mm) or less or about 0.0625 inch (1.5 mm) or less.

For some embodiments, the finger hold 15 may further include a third portion 54 that extends from the second portion 51 inwardly toward the exterior of the housing 13. For example, the third portion 54 may extend generally laterally in a direction generally perpendicular to the housing 13. The third portion 54 may extend all or only part of the way back to the housing 13, may be straight or curved, and may be a piece distinct from or integrally formed with the second portion 51. The length and width of the third portion may be similar to, or larger or smaller than, those of the second portion 51. For some embodiments, the first, second, and third portions 50, 51, 54 of the finger hold 15 may form a closed loop.

The shape of the finger hold 15 and the space 52 within the finger hold 15 may vary. For example, in FIGS. 1-4 the finger hold 15 may have a closed, generally square space 52, where the first, second, and third portions are integrally formed with one another and extend in a closed loop defining a generally square space 52. Other embodiments may have finger holds and spaces with different shapes. Some examples of differently shaped finger holds and spaces are shown in FIGS. 5a-5d. The finger hold 15 of FIG. 5A includes integrally formed first, second, and third portions 50, 51, 54 having a closed, generally rectangular space 52 for two or more fingers of the operator. The finger hold 15 of FIG. 5B includes integrally formed first, second, and third portions 50, 51, 54 having a closed, generally circular space 52 for at least one finger of the operator. The finger hold 15 of FIG. 5C has only first and second portions 50, 51 defining an open, generally square or rectangular space 52. The finger hold 15 of FIG. 5D includes first, second, and third portions 50, 51, 54 having an open, generally rectangular space 52, the third portion 54 terminating short of the housing 13. Other embodiments may have finger holds with irregular shapes.

The finger hold allows an operator to maintain a firm, steady grip on the filter 10 when the filter 10 is being handled by the operator, especially when the filter 10 is filled with fluid. In many industries, e.g., the electronics, chemical, or pharmaceutical industry, the fluids being filtered may be toxic, corrosive, or otherwise harmful to the operator. Consequently, handling a filter filled with the fluid can be hazardous. By providing a filter 10 having a finger hold 15, the filter 10 may be securely and safely handled, for example, securely and safely removed from the manifold and discarded. A filter 10 having both a finger hold 15 and a drip reservoir 34 even better protects the operator. The drip reservoir 34 collects and isolates any leaks or spills from the filter 10 or a manifold, for example, when the filter 10 is removed from the manifold. The finger hold 15 allows the operator to securely hold the filter 10 upright, e.g., after removal, preventing any further spills as the filter 10 is moved away from the manifold. Even for more benign, non-toxic fluids, the finger hold 15 or the combination of the finger hold 15 and the drip reservoir 34 allow the filter 10 to be securely handled with far less spillage or mess.

To provide an even more secure hold, the filter 10 may include a knuckle rest 55 allowing the operator's knuckles to rest against the housing when the operator's finger(s) is positioned in the finger hold. The knuckle rest may be variously configured. For example, the finger hold may be located on the housing below the finger hold. The inner edge 56 of the finger hold 15 may be substantially aligned with the exterior of the body 21, i.e., the inner edge 56 of the finger hold 15 may be aligned with or spaced from the exterior of the body 21 by a distance less than about 0.75 inch (2 cm) or less than about 0.5 inch (13 mm) in a lateral direction, i.e., a direction generally perpendicular to the longitudinal axis A. In the illustrated embodiment, the finger hold 15 may be located on the flange 22, and the knuckle rest 55 may include a portion of the exterior surface of the body 21 below the flange 22. With the operator's finger(s) in the finger hold 15, the remaining knuckles of the operator may contact the knuckle rest 55, providing an even steadier and more secure hold on the filter 10.

Figure 6:
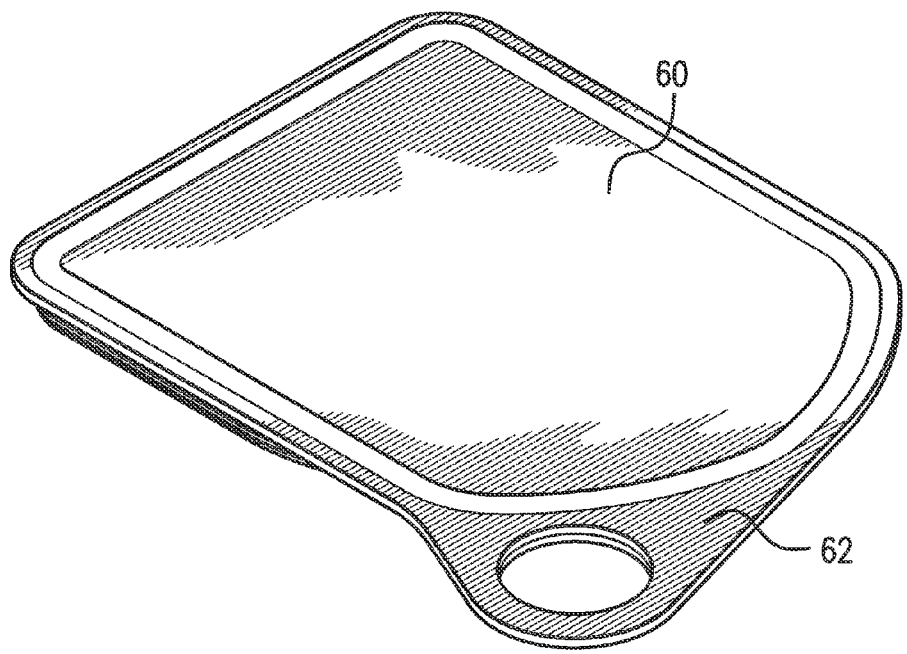
FIGS. 6 and 7 are top and bottom perspective views of a cap for the filter.
Figure 7:
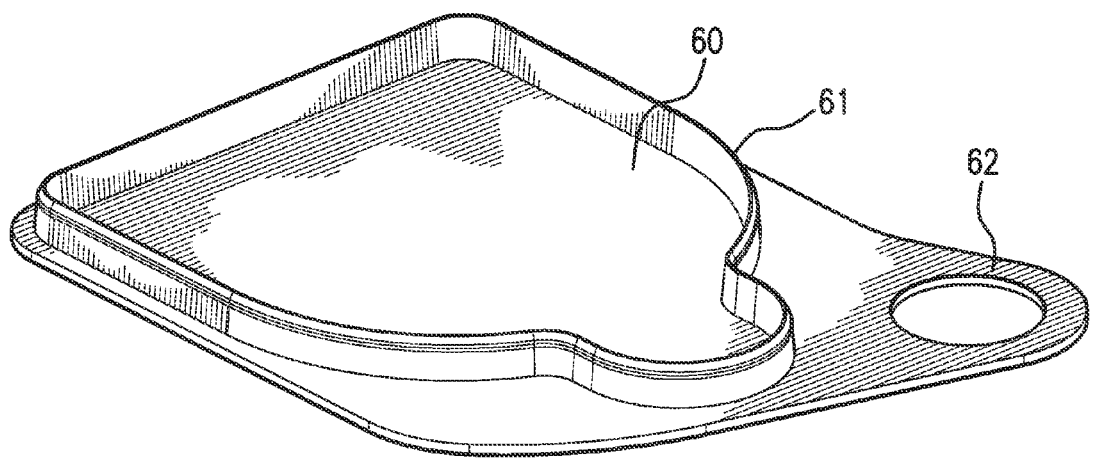

To even more securely contain and isolate any fluid within the drip chamber, some embodiments of the filter may further include a cap that may be attached to the housing covering and closing off the drip chamber. The cap may be formed from an impervious material, including, for example, an impervious polymeric or elastomeric material. The cap may be configured in any of numerous ways. For example, the cap 60 may be domed or, as shown in FIGS. 6 and 7, generally flat. The cap 60 may be attachable to the housing 13 in any of various ways. For example, the cap may be threaded or snap-fit to the housing, e.g., to the wall 35 of the flange 22. For some embodiments, the cap 60 may include a lip 61 on the underside of the cap 60 that may be snap-fit around the edge of the drip reservoir 34 at the top of the flange 22, more securely containing or even sealing any fluid within the drip reservoir. The cap 60 may also be arranged to contact and fit tightly over the fittings 11, 12, or may include projections that extend into and close off the fittings to even better prevent any spillage from the fittings into the drip reservoir 34 after the cap 60 has been attached to the housing 13. For some embodiments, the cap 60 may also include a finger pull 62 allowing the cap 60 to be more easily removed from the drip reservoir 34.

The present invention thus encompasses innumerable embodiments and is not restricted to the particular embodiments that have been described, illustrated, and/or suggested herein. Rather, the present invention includes all embodiments and modifications that may fall within the scope of the claims.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "for example," "such as," and "e.g.") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter comprising:
   first and second fittings;
   a permeable filter medium;
   a housing having a longitudinal axis, an upper region, a top, a bottom and an exterior, wherein the housing defines a fluid flow path within the housing between the first and second fittings, the permeable filter medium being arranged in the fluid flow path to remove one or more substances from a fluid flowing along the fluid flow path, wherein the housing includes a body having a top and a flange at the top of the body, wherein the body contains the filter medium, wherein the flange has a first region that extends outwardly from the body in a direction generally perpendicular to the longitudinal axis, and has a drip reservoir and a wall surrounding the drip reservoir, the first and second fittings being positioned in the drip reservoir surrounded by the wall; and
   a finger hold positioned in the upper region of the housing and including a first portion that extends outwardly from the exterior of the housing, a second portion that extends downwardly toward the bottom of the housing from the first portion, and a third portion that extends from the second portion inwardly toward the exterior of the housing, wherein the first, second and third portions are integrally formed with one another and define a closed loop for receiving one or more fingers of the operator; wherein the housing exterior includes a knuckle rest that extends in a direction parallel to the longitudinal axis below the finger hold and defines a surface that is spaced from the finger hold in a direction generally perpendicular to the longitudinal axis and allows one or more knuckles of the operator to rest against the housing with one or more fingers in the finger hold, wherein the finger hold extends from the flange.

2. The filter of claim 1 wherein the first and second fittings are positioned at the top of the housing.

3. The filter of claim 1 wherein the finger hold is located at the top of the body on one side of the housing.

4. The filter of claim 1 wherein the first portion of the finger hold extends from the wall.

5. The filter of claim 1 further comprising a cap attachable to the housing to enclose the drip reservoir.

6. The filter of claim 1 wherein the first and second fittings each include a receptacle for receiving a nozzle of a manifold.

7. A filter comprising:
   first and second fittings, each of the first and second fittings having a top;
   a permeable filter medium;

a housing having an exterior, an upper region, a bottom and a longitudinal axis, wherein the housing defines a fluid flow path within the housing between the first and second fittings, the permeable filter medium being arranged in the fluid flow path to remove one or more substances from a fluid flowing along the fluid flow path, and wherein the housing further includes a body and a flange at the top of the body, wherein the body contains the permeable filter medium and the flange has a first region that extends outwardly from the body in a direction generally perpendicular to the longitudinal axis, wherein the flange has a drip reservoir including a basin and a wall having a top and surrounding the drip reservoir, the first and second fittings being positioned within the drip reservoir at the top of the body surrounded by the wall such that the top of each of the first and second fittings is even with or below the top of the wall, and wherein the first region of the flange defines a ledge facing downwardly toward the bottom of the housing and extending in a plane generally perpendicular to the longitudinal axis on opposite sides of the body; and a finger hold including a first portion that extends outwardly from the wall of the flange in a direction generally perpendicular to the longitudinal axis and a second portion that extends downwardly toward the bottom of the housing from the first portion in a direction generally parallel to the longitudinal axis of the housing, wherein the length and width of the second portion and the distance between the second portion and the wall of the flange define a space that is sufficient to allow one or more fingers of an operator to fit in the space, wherein the finger hold further includes a third portion that extends from the second portion inwardly towards the housing in a direction generally perpendicular to the longitudinal axis, wherein the first, second, and third portions are integrally formed and define a closed loop, the space being located within the closed loop, the housing further comprising a knuckle rest that extends in a direction generally parallel to the longitudinal axis along the body below the finger hold, the knuckle rest defining a surface on the body that is sufficiently close to the finger hold to allow one or more knuckles of the operator to rest against the body with one or more fingers in the finger hold.

* * * * *